United States Patent
Keating et al.

(10) Patent No.: US 9,244,753 B2
(45) Date of Patent: Jan. 26, 2016

(54) REDUNDANT BUS FAULT DETECTION

(71) Applicants: Michael J. Keating, Hardwick, NJ (US); Harald Schermann, Unterschweinbach (DE); Paul Richard Strelecki, Whitehouse Station, NJ (US); Vincent Baroncini, Rockaway, NJ (US); Pablo Torres, Springfield, NJ (US)

(72) Inventors: Michael J. Keating, Hardwick, NJ (US); Harald Schermann, Unterschweinbach (DE); Paul Richard Strelecki, Whitehouse Station, NJ (US); Vincent Baroncini, Rockaway, NJ (US); Pablo Torres, Springfield, NJ (US)

(73) Assignee: Siemens Schweiz AG, Zurich (CH)

( * ) Notice: Subject to any disclaimer, the term of this patent is extended or adjusted under 35 U.S.C. 154(b) by 496 days.

(21) Appl. No.: 13/833,021

(22) Filed: Mar. 15, 2013

(65) Prior Publication Data
US 2014/0281752 A1    Sep. 18, 2014

(51) Int. Cl.
| G08B 21/00 | (2006.01) |
| G06F 11/07 | (2006.01) |
| G08B 29/12 | (2006.01) |
| G08B 29/16 | (2006.01) |
| G06F 11/20 | (2006.01) |
| G06F 11/32 | (2006.01) |

(52) U.S. Cl.
CPC ........ *G06F 11/0757* (2013.01); *G06F 11/0745* (2013.01); *G08B 29/123* (2013.01); *G08B 29/16* (2013.01); *G06F 11/2007* (2013.01); *G06F 11/327* (2013.01)

(58) Field of Classification Search
CPC ............ G06F 11/0745; G06F 11/0757; G06F 11/2007; G06F 11/327; G08B 29/123; G08B 29/16
See application file for complete search history.

(56) References Cited

U.S. PATENT DOCUMENTS

| 4,259,548 | A  | * | 3/1981  | Fahey ............... H04M 11/04 340/506 |
| 4,689,619 | A  | * | 8/1987  | O'Brien, Jr. ......... H04J 3/0682 340/10.2 |
| 5,390,326 | A  |   | 2/1995  | Shah |
| 6,084,521 | A  | * | 7/2000  | Ha .................... G08B 29/16 200/182 |
| 6,195,018 | B1 | * | 2/2001  | Ragle ................ G08C 15/06 340/870.01 |
| 6,275,160 | B1 | * | 8/2001  | Ha .................... G08B 29/185 200/182 |
| 8,332,693 | B2 | * | 12/2012 | Cao ..................... H04L 41/06 370/228 |
| 8,487,739 | B2 | * | 7/2013  | Lewis ................. H04N 5/00 340/5.2 |
| 8,977,794 | B2 | * | 3/2015  | Grohman ............ F24F 11/0009 710/104 |
| 2001/0023392 | A1 | * | 9/2001 | Nakatsuhama ..... G06F 11/0757 702/120 |
| 2001/0049759 | A1 | * | 12/2001 | Miura ................ G06F 13/4213 710/107 |
| 2002/0064185 | A1 | * | 5/2002 | Nakai ................. H04J 3/0655 370/519 |
| 2002/0087763 | A1 | * | 7/2002 | Wendorff ............ H04L 12/437 710/100 |
| 2002/0152411 | A1 | * | 10/2002 | Olsen .................... G06F 1/14 713/500 |
| 2003/0028687 | A1 | * | 2/2003 | Goossen ............ G06F 13/4095 710/1 |
| 2004/0176877 | A1 |   | 9/2004 | Hesse et al. |

(Continued)

FOREIGN PATENT DOCUMENTS

EP    1901145 A2    3/2008

OTHER PUBLICATIONS

Failure Detection in a Symmetric System, IBM Technical Disclosure Bulletin, International Business Machines Corp. (Thornwood), US, vol. 38, No. 1, Jan. 1, 1995, pp. 173-175, XP000498729. (4 pages).

(Continued)

*Primary Examiner* — Quang D Pham

(57) ABSTRACT

A system and method for an approach of detecting faults in a redundant bus system based upon four timers.

12 Claims, 7 Drawing Sheets

(56) References Cited

U.S. PATENT DOCUMENTS

| | | | | |
|---|---|---|---|---|
| 2004/0230878 | A1* | 11/2004 | Mantey | G06F 11/0757 714/53 |
| 2005/0015521 | A1* | 1/2005 | Hartwich | H04J 3/0655 710/48 |
| 2005/0066062 | A1* | 3/2005 | Hartwich | G05B 19/042 710/1 |
| 2005/0076270 | A1* | 4/2005 | Bogenrieder | H04L 1/24 714/56 |
| 2005/0180362 | A1* | 8/2005 | Chin | H04W 74/0833 370/335 |
| 2006/0174042 | A1* | 8/2006 | Weigl | H04L 12/40 710/100 |
| 2006/0233193 | A1* | 10/2006 | Ungermann | G06F 11/2005 370/464 |
| 2007/0174344 | A1* | 7/2007 | Goh | G06F 1/3203 1/1 |
| 2008/0170475 | A1* | 7/2008 | Simon | A63B 71/06 368/109 |
| 2008/0273527 | A1* | 11/2008 | Short | H04J 3/0655 370/364 |
| 2008/0276107 | A1* | 11/2008 | Bogavac | H04L 12/12 713/323 |
| 2008/0307132 | A1* | 12/2008 | Zaks | G06F 13/385 710/106 |
| 2009/0001892 | A1* | 1/2009 | Van Boekhout | H05B 37/0254 315/149 |
| 2009/0240857 | A1* | 9/2009 | Hartwich | G06F 13/4286 710/107 |
| 2009/0276666 | A1 | 11/2009 | Haley et al. | |
| 2010/0020810 | A1* | 1/2010 | Li | H04L 12/12 370/400 |
| 2010/0253531 | A1* | 10/2010 | Qiu | G08B 5/36 340/691.3 |
| 2013/0027198 | A1* | 1/2013 | Piccolo, III | G08B 17/00 340/506 |
| 2014/0103955 | A1* | 4/2014 | Avritch | G01R 31/028 324/764.01 |
| 2014/0281752 | A1* | 9/2014 | Keating | G06F 11/0757 714/56 |

OTHER PUBLICATIONS

PCT Search Report dated Jul. 4, 2014, for Application No. PCT/US2014/027917. (8 pages).

* cited by examiner

REDUNDANT BUS FAULT DETECTION

FIELD OF THE INVENTION

This application relates to the field of system bus communication, and particularly to fault detection in a redundant bus building automation system.

BACKGROUND

Numerous regulatory agencies dealing with building safety have established different safety classifications for different electrical circuits and communication transmission pathways. The highest level of safety class is "class X" (see 12.3.6 NFPA 72 2010 safety regulation). In order to obtain a "class X" classification, the following requirements must be meet:

All circuits have a redundant path.
Circuit paths between the Fire Alarm Central Unit (FACU) and remote peripherals shall continue to operate flawlessly under the condition of a single open or a single short circuit condition.
Circuit paths shall be monitored and supervised to detect and annunciate a short or open circuit condition.

Thus, FACU and remote peripherals must be monitored and any short or open circuit conditions must be annunciated in order to fulfill the requirements of the "class X" performance criteria.

As redundant circuits are typically routed via different physical transmission pathway locations for the obvious safety reasons; the propagation delays experienced on one pathway versus another will vary. Real world cable propagation delays of five nanoseconds per meter or more preclude a simple solution of combinatorial logic being implemented on the redundant received data lines of the two pathways to arrive at a desired logic level for the desired bit time.

Currently, simplistic approaches have been used to detect open or short conditions in a circuit. Such approaches detected the fault and provided little or no additional information. In a fire or disaster, additional information enables first responders to better understand where problems or dangers may exist. Maintainers of a redundant bus system may also benefit from additional information when an error is detected in a system and more quickly correct detected faults. Therefore, there is a need for an approach that not only detects a short or open circuit, but provides additional information that may aid in correcting the fault or identifying at risk areas during an emergency.

SUMMARY

In accordance with one embodiment of the disclosure, there is provided a method of monitoring redundant communication buses using timers to assure at least one data path exists to physical units from a controller.

The above described systems, methods, features and advantages of the present invention, as well as others, will become more readily apparent to those of ordinary skill in the art by reference to the following detailed description and accompanying drawings. While it would be desirable to provide an automated Demand Response system that provides one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DESCRIPTION

Figure 1:
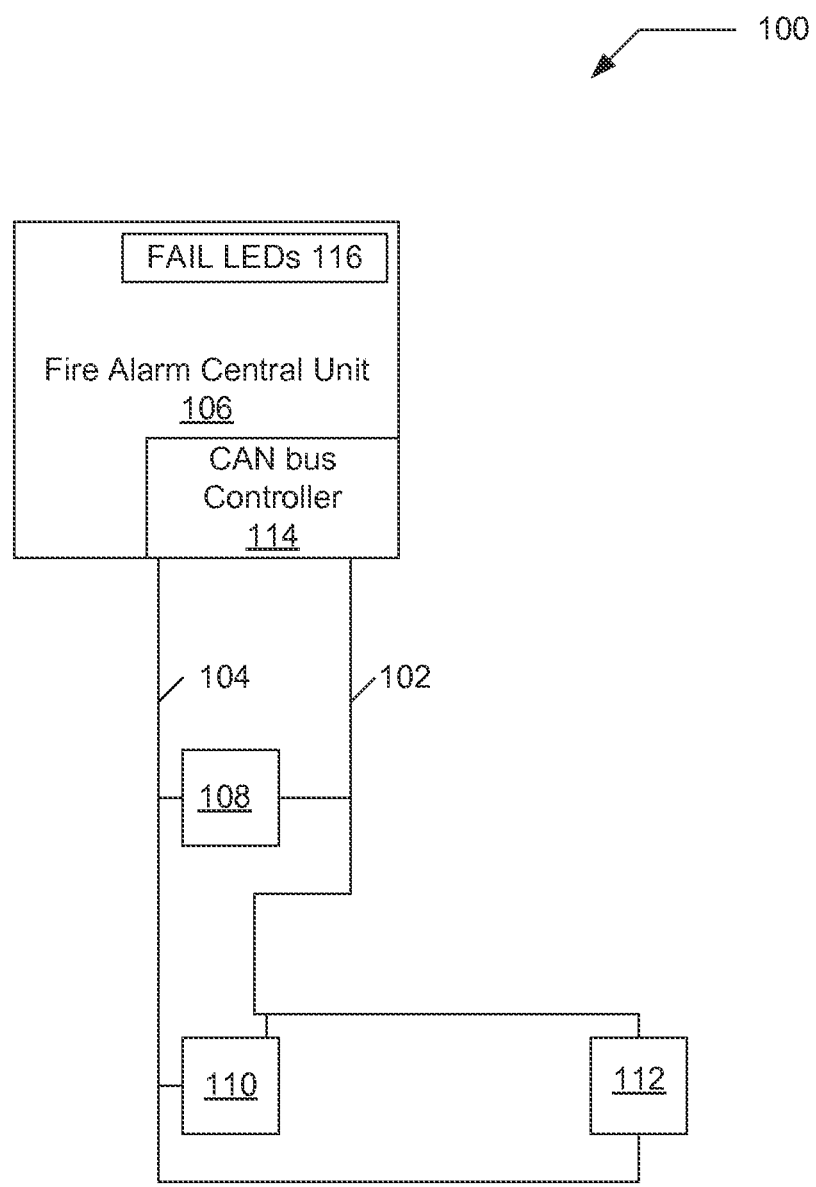
FIG. 1 shows a block diagram of redundant buses with fault detection approach that connects a fire alarm central unit (FACU) and remote peripherals in accordance with an example implementation.

An approach for a redundant communication bus having fault detection, annunciation, and mitigation within a building is described. With reference to FIG. 1, a block diagram 100 of redundant buses 102, 104 with fault detection approach that connects a fire alarm central unit (FACU) 106 and remote peripherals 108, 110, and 112 in accordance with an example implementation. The FACU 106 may have a bus controller, such as a Controller Area Networking (CAN) bus controller 114 and FAIL light emitting diodes (LEDs) 116. The FAIL LEDs 116 indicate if an error or fault has been detected in the FACU 106 or communication buses 102 and 104. The LED is a visual indicator. In other implementations, different or additional visual and audio indicators may be employed. For example, mechanical flags, incandescent light bulbs, alarms, bells, etc. In yet other implementations, a less desirable approach of having a single visual indicator to identify a fault on one of the redundant buses may be implemented rather than an LED associated with each type of error on each bus.

The CAN bus controller 114 is a multi-master broadcast serial bus approach for connecting remote peripherals 108, 110, and 112 with FACU (106) and each other. Each remote peripheral 108, 110, and 112, is able to send and receive messages, but not simultaneously. A message may consist of an ID (identifier), which represents the priority of the message, and up to eight data bytes. It is transmitted serially onto the bus. This signal pattern may be encoded in non-return-to-zero (NRZ) and is sensed by all nodes.

The remote peripherals that are connected by a bus are typically sensors, actuators, and other control devices. These devices may not be connected directly to the bus, but through a host processor. If the bus is free, any remote peripheral or controller may begin to transmit. If two or more remote peripherals or controllers begins sending messages at the same time, the message with the more dominant ID (which has more dominant bits, i.e., zeroes) may overwrite other nodes' less dominant IDs, so that eventually (after this arbitration on the ID) only the dominant message remains and is received by all nodes. This mechanism is typically referred to as priority based bus arbitration or more specifically Carrier Sense Multiple Access with collision detection. Messages with numerically smaller values of IDs have higher priority and are transmitted first.

Each remote peripheral may require a host processor that decides what received messages mean and which messages it wants to transmit itself. The sensors, actuators, and control devices are typically connected to the host processor. When receiving, the CAN controller may store received bits serially from the bus until an entire message is available, which can then be fetched by the host processor (usually after the CAN controller has triggered an interrupt). When sending, the host processor stores it's transmit messages to a CAN controller, which transmits the bits serially onto the bus.

A CAN bus transceiver is able to transmit and receive messages, typically which it receives\sends from\to the node's microcontroller. When receiving, the transceiver adapts differential signal levels from the bus to levels that the CAN controller expects and may have protective circuitry that protects the CAN controller. When transmitting, the transceiver converts the transmit-bit signal received from the CAN controller into a differential signal that is sent on the bus.

Typically, bit rates up to 1 Mbit/s are possible at network lengths below 40 m. But, by decreasing the bit rate, longer network distances (e.g., 500 m at 125 kbit/s) may be achieved. Note: we limit at about 500 m at 50 kbit/s. The CAN data link layer protocol is standardized in ISO 11898-1 (2003). This standard describes mainly the data link layer (composed of the logical link control (LLC) sub-layer and the media access control (MAC) sub-layer) and some aspects of the physical layer of the OSI reference model. All the other protocol layers are typically network or implementation specific.

By timing different aspects of bus signals, such as the redundant CAN bus shown in FIG. 1, the "health" of the bus may be ascertained and ensure that the delivered signal is able to be delivered between the FACU 106 and all remote peripherals 108, 110, and 112. In the current example implementation, four timing parameters may be qualified and inspected by the bus controller (CAN bus controller 114). Each of the timing parameters may be unique to an individual system and the time value for each may be tailored to that system or installation. The four timing parameters are (1) power up/cold start reset, (2) periodic activity, (3) valid bit time, and (4) maximum pathway delay.

Figure 2A:
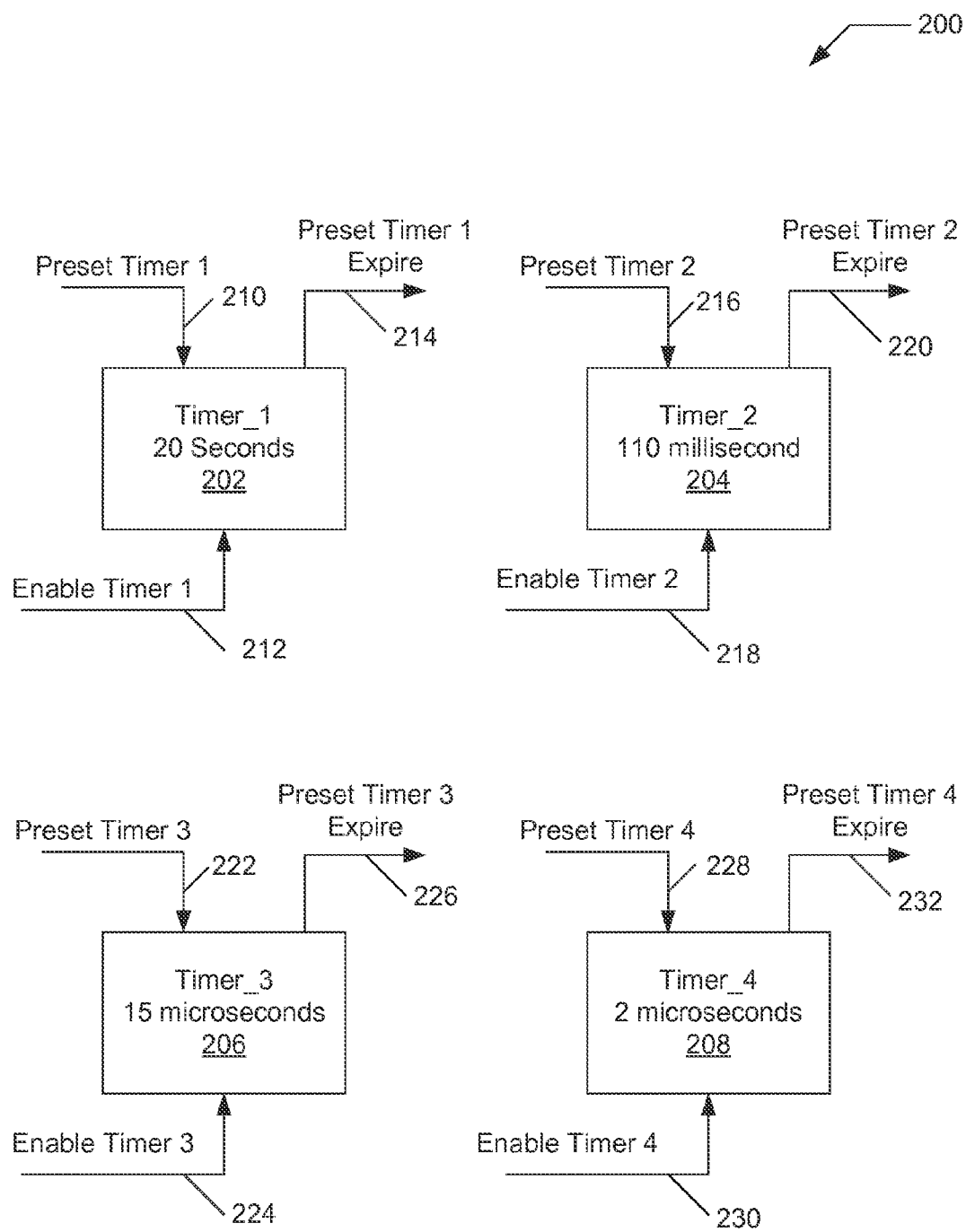
FIG. 2a depicts flow diagrams of timers implemented in the redundant bus with fault detection approach of FIG. 1 in accordance with an example implementation.

Turning to FIG. 2a, flow diagram 200 of timer parameters 202, 204, 206, and 208 implemented in the redundant bus with fault detection approach of FIG. 1 in accordance with an example implementation is depicted. Timer parameter 1 202 is associated with a power up/cold start time of the controller and is the time period from power up until bus activity occurs. A finite time delay exists that a FACU 106 requires before the first activity on the bus is initiated by the CAN bus controller 114. In the current example, the time is set to a predetermined value of 20 seconds for Timer_1.

The value for Timer_1 may be determined via monitoring the power-up of the FACU 106 or by use of other times that prevent activities during power up initialization of FACU or (108), (110), (112). The Timer_1 may be preset with a 20 second value 210 and enabled via an enable Timer_1 signal 212. Upon expiration of Timer_1, a Timer_1 expiration signal or message may be triggered 214. If Timer_1 has expired and no activity has occurred on the bus, then the bus may be declared faulty. If redundant buses are present, and the other bus is not faulting, then messaging may be routed over the non-faulting bus.

The value of Timer_2 204 may be preset 216 to 110 milliseconds in the example. This time may be set for a margin of error just above the maximum typically expected CAN redundant bus traffic within a given implementation. In the current example, the FACU "pings" all its nodes to check for a response periodically. If a node does not acknowledge its address specific "ping," the FACU knows there is a problem with that peripheral. If the embodiment detects that the typically periodic ping time is exceeded, it knows that a fault condition exists and handles accordingly. The 110 milliseconds (mS) may be determined to be a threshold that some bus activity from a remote peripheral should occur or that the FACU has an error in not sending out the typically periodic "ping". If no bus activity occurs during the 110 mS once the Timer_2 is enabled 218, then the remote peripheral or FACU is no longer communicating using that bus and communication should occur over the redundant bus. Upon expiration of Timer_2, a Timer_2 expiration signal may be generated 220. The value of 110 mS is set as a constant upper threshold of silence on the bus in the current example, but in other implementations the value may be different and be determined by typical system traffic parameters in the redundant bus implementation. In yet other implementations, a controller, may keep track of the maximum time between reception of a message from a peripheral device that is less than a hard coded maximum and preset Timer_2 216 with that value.

The third timer timer_3 206 is a valid bit timer and is associated with the typical single "bit" time of the installed redundant CAN bus system. The valid bit timer is used to verify that the "bit" time is not too short (e.g. for 50 Kbits/sec a bit time is approx 20 µSec); so if Timer_3 expires true, a condition of error in the form of a concatenated bit time was not experienced. Each of the redundant buses is typically set at one speed in bits per second and remains at that speed. The speed is inversely proportional to the bit time, and may actually be 1/bit time. For example, in the case of the Siemens SII SBT CAN Bus, a transmission speed of fifty Kilobits per second is universally deployed in product offerings. This results in an individual bit time of twenty microseconds (20 µSec; or $20 \times 10^{-6}$ seconds). The CAN bus controller monitors each bit time and insures that it exceeds the minimum threshold of fifteen microseconds (15 µSec; or $15 \times 10^{-6}$ seconds). In the case of one leg of the differential redundant bus being cut; logic transitions may occur however they will be short "spikes" far below the valid bit time in duration. Therefore in the case of a less than valid bit time is detected, the CAN bus controller may detect this fault, annunciate it, and ensure the connection of a valid functioning pathway between the Cabinet and Remote Circuit Node(s). Therefore in the current example, a predetermined value of 15 mS may be used as a constant lower limit threshold; but this value may be a user configured value in other implementations. Or in yet other implementations, the value may be a "constants" loaded by the CAN bus controller at power up. In the current example, the value of Timer_3 may be preset 222 (15 mS in the current example) and enabled by signal 224. Upon expiration of Timer_3, a Timer_3 expire signal may be generated 226.

The fourth timer Timer_4 208 is associated with the cable propagation delay and is the maximum pathway delay. In a redundant bus system of known maximum cable pathway wire distances, it may be assumed that the maximum possible pathway differential between the redundant pathways may be given a propagation delay of approximately 5 nanoseconds per meter; the typical worst case delay between the pathway upon which the "$1^{st}$ bit even" is experienced and the subsequent "longer length" pathway. The CAN bus controller may initially select the first valid bus by way of first activity. The first valid bus provides connectivity between the cabinet and Remote Nodes on that specific bus. As there typically will be a maximum bus cable length and a maximum delay time per unit length of cable (e.g. five nanoseconds per meter), the CAN bus controller may ascertain a maximum expected delay time for bus activity to appear on the "longer" bus pathway. In the current example, if a maximum cable length of 300 meters is projected for one of the redundant buses and assuming a maximum transmission line propagation delay of 5 nS per meter, and adding in the propagation delay for a typical bus physical layer transceiver, a value of two microseconds (2 μSec or $2\times10^{-6}$ Seconds) may be determined as the maximum "lag" time that the longer bus pathway should exhibit compared with the first detected shorter bus pathway. Therefore, a value of two microseconds (2 μSec) may be used as a constant upper limit threshold. In other implementations, this value may be a user configured value for different systems. In yet other implementations, a value for this timer may be treated like other "constants" loaded by a master microcontroller at power up that could ascertain the correct applicable "constant" value. The value of Timer_4, the maximum pathway delay, may be preset 228 (2 mS in the current example) and enabled by signal 230. Upon expiration of timer_4, a Timer expire signal may be generated 232.

Upon cold start/reset 250, the timers of FIG. 2a are initialized with their preset values. All CAN bus pathway FAIL LEDs may be extinguished 252. Redundant bus 1 (CAN bus pathway 1) peripherals may be enabled while redundant bus 2 (CAN bus pathway 2) peripherals may be disabled 254. The cold start timer "Timer_1" 202 is also enabled 256. In the current example implementation, the terms "disabled" means to make the CAN bus pathway as a background secondary or non-primary pathway (if there are no faults present). The term "enable" means to make the CAN bus pathway the primary pathway.

A determination is made if a bit is detected on CAN bus pathway 1 258 and similarly on CAN bus pathway 2 260. If no bits have been detected, then a check is made if Timer_1 has expired 262. If Timer_1 has not expired, the bus pathway 1 and bus pathway 2 are checked again to see if a bit has been detected 258 and 260. If Timer_1 has expired 262, then the CAN pathway 1 and 2 FAIL LEDs may be illuminated 264 and steps 254 and 256 may be repeated.

Figure 2B:
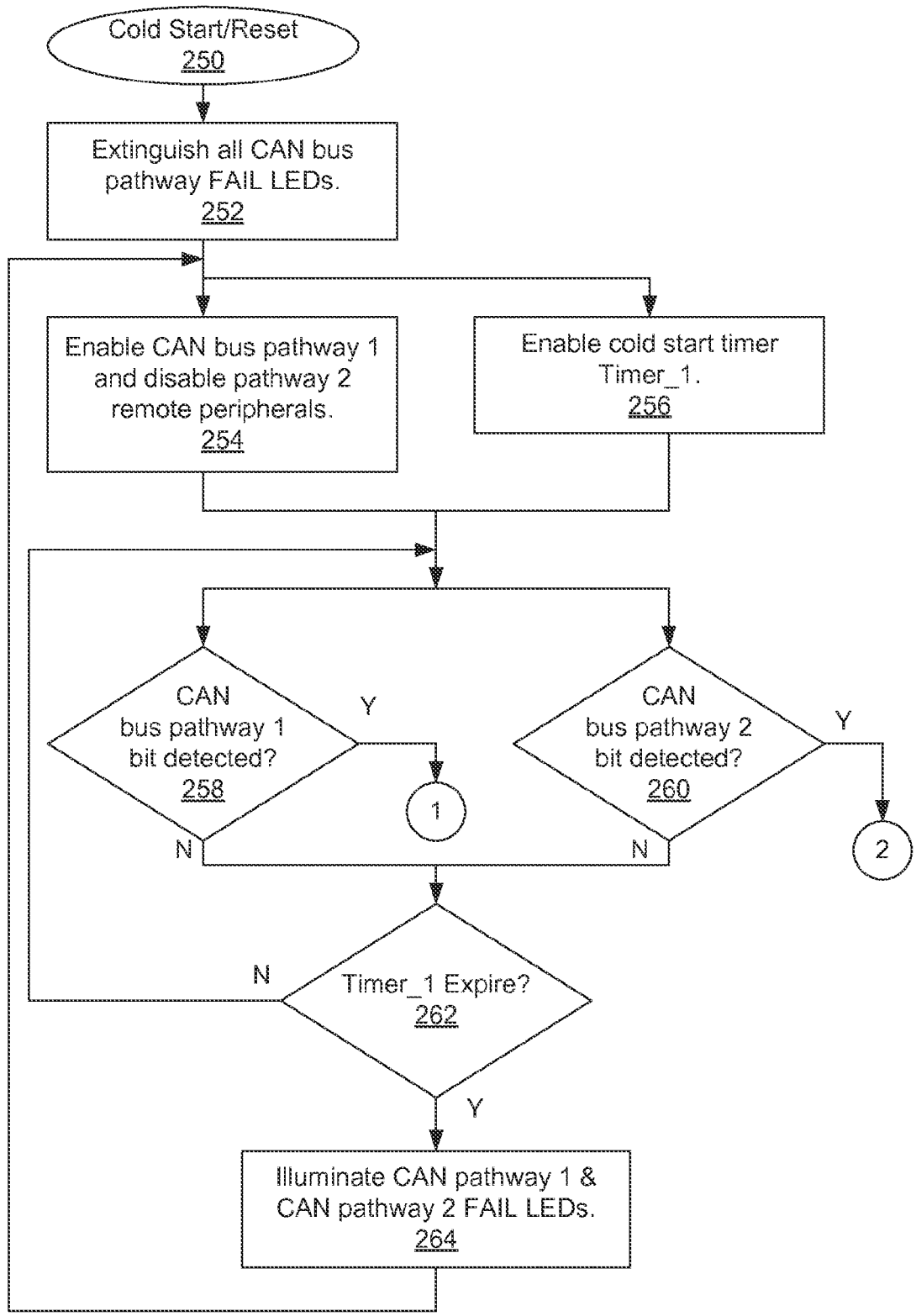
FIG. 2b depicts a flow diagram of the redundant bus with fault detection approach which makes use of the timers of FIG. 2a in accordance with an example implementation.
Figure 2C:
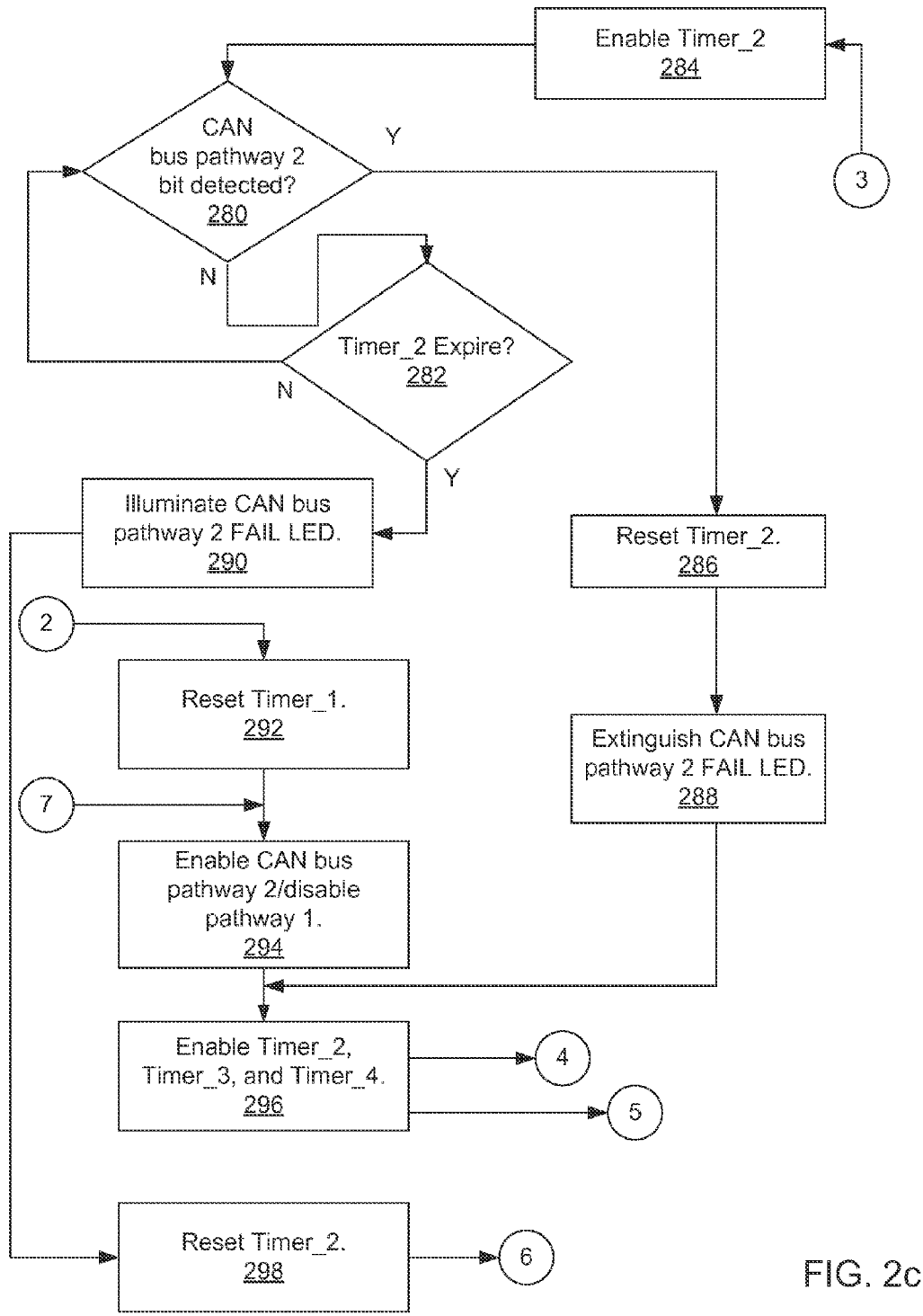
FIG. 2c depicts a continuation of the flow diagram of FIG. 2b in accordance with an example implementation.

In FIG. 2c, a continuation of the flow diagram of FIG. 2b in accordance with an example implementation is depicted. If in FIG. 2b, a bit is detected on CAN bus pathway 2, then Timer_1 is reset 292 and CAN bus pathway 1 is disabled and CAN bus pathway 2 is enabled 294. Timer_2, Timer_3 and Timer_4 are also enabled at this time 296 and the flow continues to FIG. 2d.

Figure 2D:
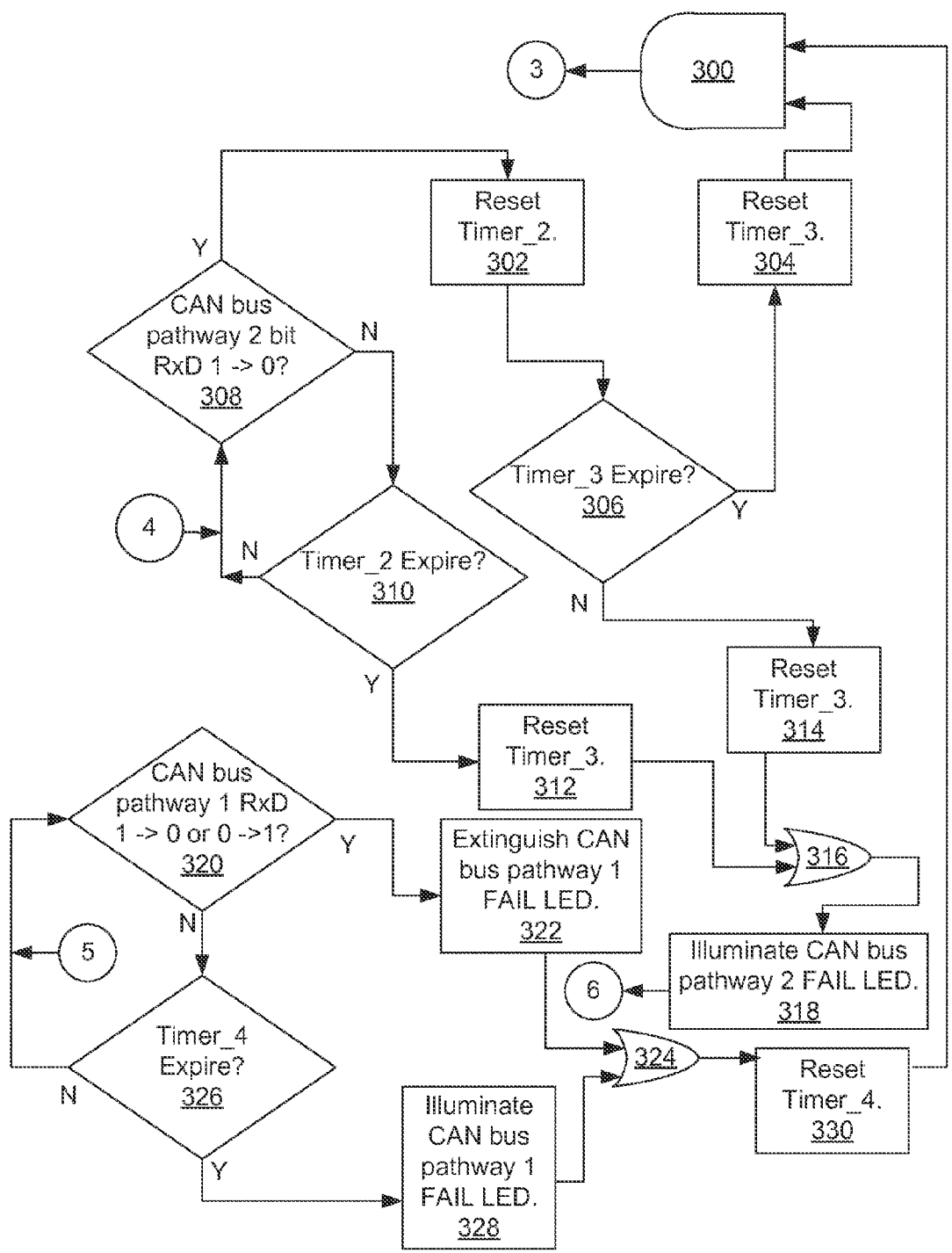
FIG. 2d depicts a continuation of the flow diagram of FIGS. 2b and 2c in accordance with an example implementation.

Turning to FIG. 2d, a continuation of the flow diagram of FIGS. 2b and 2c in accordance with an example implementation is depicted. After the timers (Timer_2, Timer_3, and Timer_4) have been activated 296 FIG. 2c, a determination is made if another bit is detected on CAN bus pathway 2 308. If a bit is detected on CAN bus pathway 2 308, then Timer_2 is reset 302. A check is then made if Timer_3 has expired 306. If Timer_3 has expired, then Timer_3 is reset 304 and one of the two inputs into AND function 300 is set. If Timer_3 has not expired 306, then Timer_3 is reset 314 and one of two inputs to "OR" function 316 is set.

Furthermore, after the timers (Timer_2, Timer_3, and Timer_4) have been activated 296 FIG. 2c a determination is made if CAN bus pathway 1 has activity 320, where "1->0 or 0->1" means either a bit transition of dominant to recessive or recessive to dominant activity. If there is activity on CAN pathway 1 320, then the CAN bus pathway 1 FAIL LED is extinguished 322 and an input to "OR" function 324 may be set. If there is no activity on CAN bus pathway 1, 320 and Timer_4 has expired, then CAN bus pathway 1 FAIL LED is illuminated 328 and a second input to the "OR" function 324 may be set. Otherwise, if there is no activity on CAN bus pathway 1 320 and Timer_4 has not expired 326, then a check is again made for activity on CAN bus pathway 1 320. If either of the inputs to the "OR" function is set, then the second condition for "AND" function 300 is set.

If no bit is detected on CAN bus pathway 2 308 and Timer_2 has not expired 310, then CAN bus pathway 2 is again checked for RxD 1->0. If Timer_2 has expired 310, then Timer_3 is reset 312 and a second condition to "OR" function 316 is set. If either condition of "OR" function 316 is set, then CAN bus pathway 2 FAIL LED is illuminate. If both condition of "AND" function 300 are set, then Timer_2 is enabled 284 FIG. 2c and a determination is made if a bit is detected on CAN bus pathway 2 280. If a bit is detected on CAN bus pathway 2 280, then Timer_2 is reset 286 and the CAN bus pathway 2 FAIL LED is extinguished 288. Timers Timer_2, Timer_3, and Timer_4 may then be enabled 296 and processing continues in FIG. 2d. Otherwise if CAN bus pathway 2 bit is not detected 280 and Timer_2 is expired 282, then CAN bus pathway 2 FAIL LED is illuminated 290 and Timer_2 is reset 298 and processing continues at 362, FIG. 2e. If Timer_2 has not expired 282, then CAN bus pathway 2 is checked again for a bit 280.

Figure 2E:
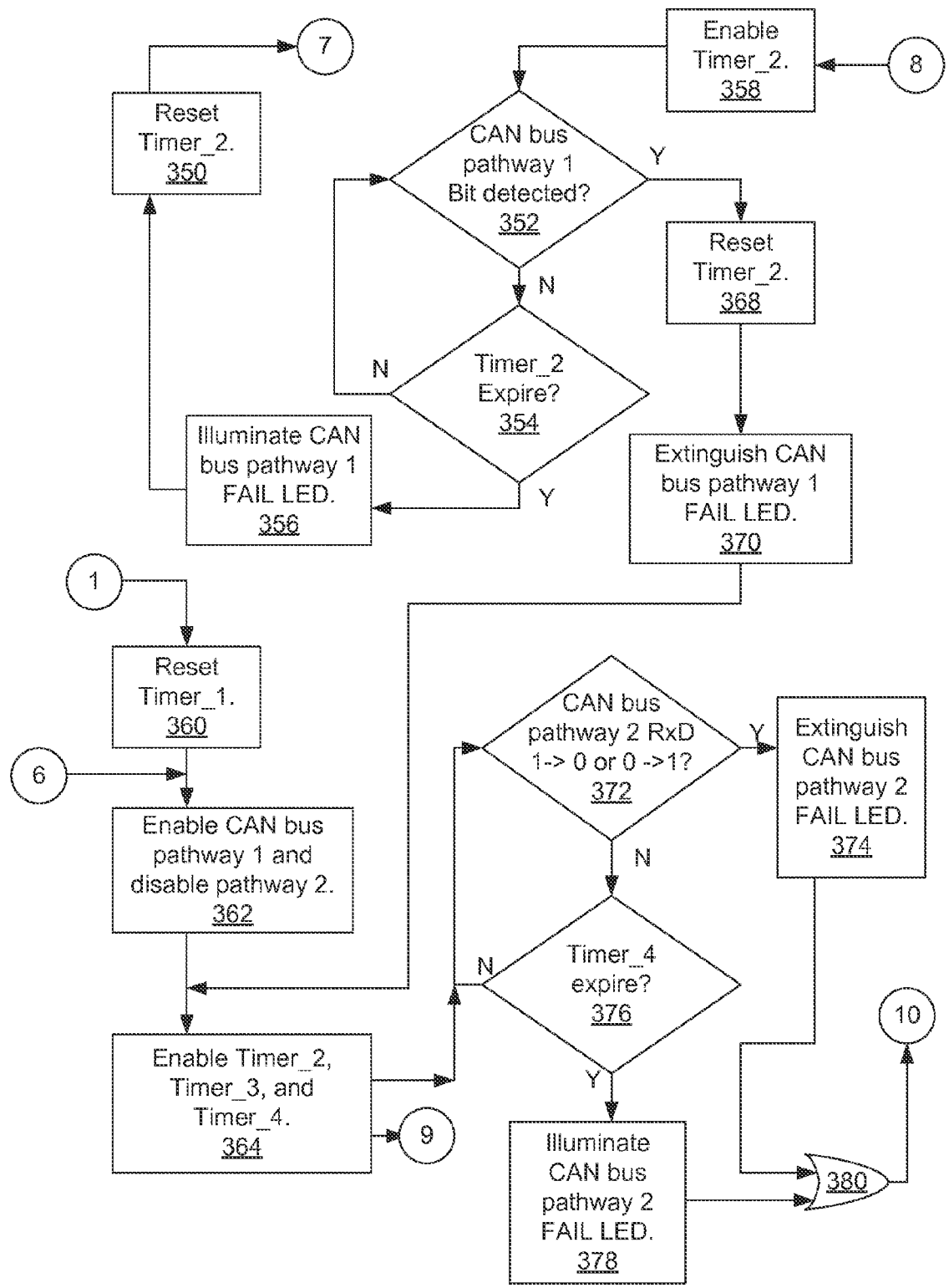
FIG. 2e depicts a continuation of the flow diagram of FIG. 2b-2d in accordance with an example implementation.

Turning to FIG. 2e, a continuation of the flow diagram of FIG. 2b-2d in accordance with an example implementation is depicted. Timer_1 is reset 360 after a bit has been detected on CAN bus pathway 1 258 FIG. 2b. The CAN bus pathway is enabled and CAN bus pathway 2 is disabled 362. Timer_2, Timer_3, and Timer_4 are enabled 364 and checks are made for activity on CAN bus pathway 2 372. If CAN bus pathway 2 has activity, then CAN bus pathway 2 FAIL LED is extinguished 374 and a condition is set for "OR" function 380. Otherwise, if CAN bus pathway 2 activity is not detected 372 a check is made if Timer_4 has expired 376. If Timer_4 has not expired 376, then CAN bus pathway 2 is checked for activity again 372. Otherwise if Timer_4 has expired 376, then CAN bus pathway 2 FAIL LED is illuminated 378 and the second condition is set on "OR" function 380.

Figure 2F:
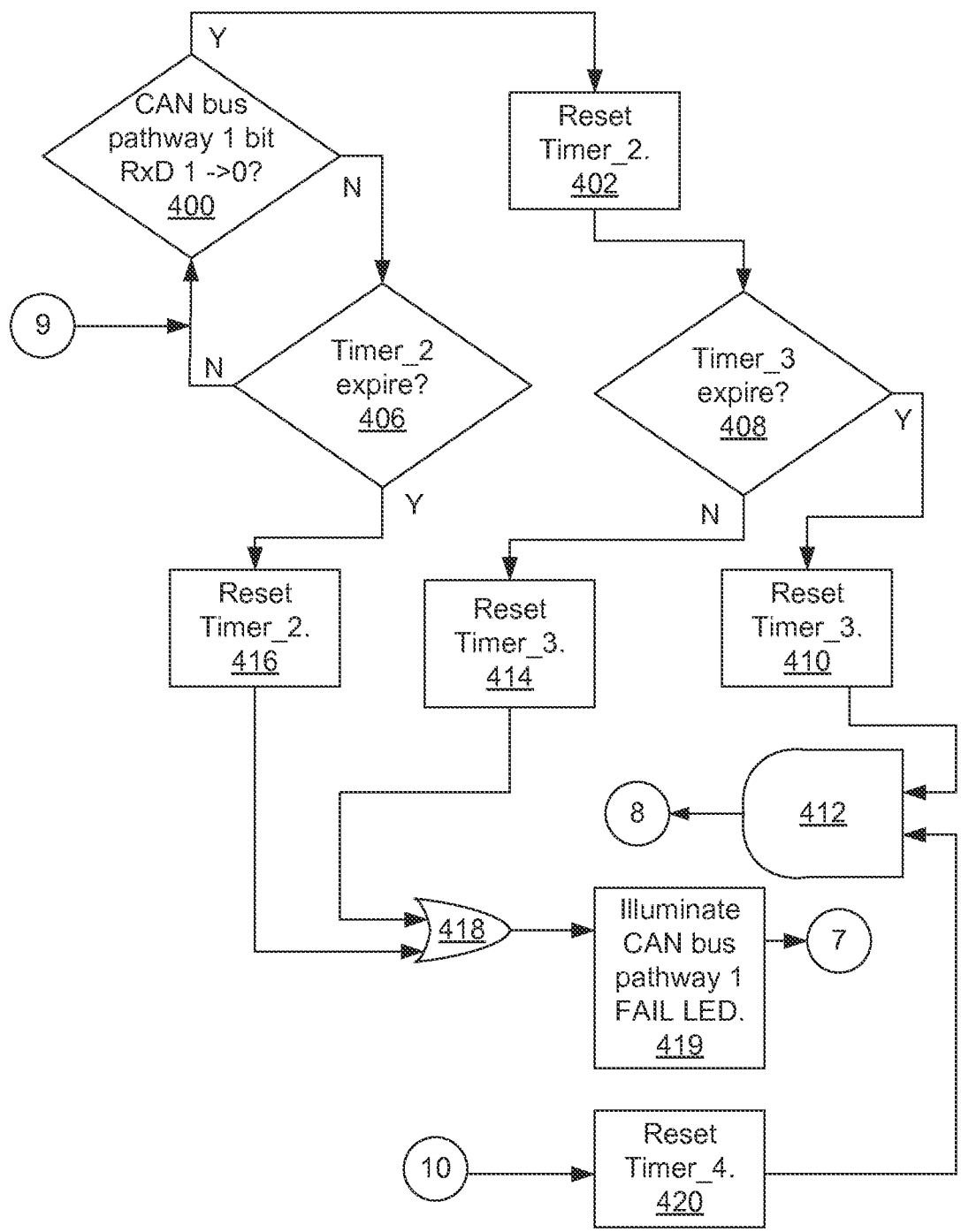
FIG. 2f depicts a continuation of the flow diagram of FIG. 2b-2e in accordance with an example implementation.

In FIG. 2f, a continuation of the flow diagram of FIG. 2b-2e in accordance with an example implementation is depicted. Once Timer_2, Timer_3, and Timer_4 have been enabled 364 FIG. 2e, a check is made on CAN bus pathway 1 to determine if a bit has been detected 400. If a bit has been detected on CAN bus pathway 1, Timer_2 is reset 402 and a check is made if Timer_3 has expired 408. If Timer_3 has expired 408, then Timer_3 is reset 410 and the first condition of the "AND" function 412 is set. If Timer_3 has not expired 408, then Timer_3 is reset 414 and the first condition of the "OR" function 418 is set.

If a bit is not detected on CAN bus pathway 1 400, then a check is made to determine if Timer_2 has expired 406. If Timer_2 has not expired 406, then the CAN bus pathway 1 is checked again 400. If Timer_2 has expired 406, then Timer_2 is reset 416 and the second condition of an "OR" function 418 is set. If either condition of "OR" function 418 is set, then CAN bus pathway 1 FAIL LED is illuminated 419.

Furthermore, if either condition of "OR" function 380 FIG. 2e are set, then Timer_4 420 FIG. 2f is reset and the second condition of "AND" function 412 is set. If both conditions of the "AND" function 410 are set, then Timer_2 is enabled 358 FIG. 2e and a determination is made if a bit has been detected on CAN bus pathway 1 is made 352.

If a bit is detected on CAN bus pathway 1 352, then Timer_2 is reset 368 and the CAN bus pathway 1 FAIL LED is extinguished 370 and Timer_2, Timer_3, and Timer_4 are enabled 364. If a bit is not detected on CAN bus pathway 1 352, then a check of expiration of Timer_2 is made 354. If Timer_2 has not expired 354, then the CAN bus pathway 1 is again checked for a bit 352. Otherwise, if Timer_2 has expired, 354 CAN bus pathway 1 FAIL LED is illuminated 356 and Timer_2 is reset 350. After Timer_2 is reset 350, then CAN bus pathway 2 is enabled and CAN bus pathway 1 is disabled 294 FIG. 2c. Similarly if CAN bus pathway 1 FAIL LED is illuminated 419, then CAN bus pathway 2 is enabled and CAN bus pathway 1 is disabled 294.

The immediate annunciation of a fault detection and continuous monitoring of bus health of the redundant CAN bus pathways inherently provides additional information to managers of Building Technology safety logistics. Additional information in the immediate detection of faults such as accidently cut wire paths (i.e. miscellaneous construction activity such as drilling through a sheet rock wall) may be identified and rectified before time of emergency. A simple cold start "power up" system check may be routinely performed to verify the health of BOTH CAN bus pathways and provide managers of Building Technology safety the ease of mind from the additional information that the redundant CAN bus pathways are both fully operational BEFORE an emergency condition occurs. The system also provides the FACU additional information which in turn may be provided to Building Technologies safety management personnel. Should some circuit failure occur between certain nodes of the pathway, the FACU may quickly sequentially ping the nodes from nearest to most distant and identify the exact geographical location area of the fault by observing the last successful response to a ping and the first failed response. This additional information precludes the need of physically examining the entire circuit pathway to identify the exact location of the short or open circuit condition. Finally, should one pathway fail during an emergency prior to other fire or smoke detector modules, additional information in the form of knowing the regional geographic core of a possible emergency (i.e. fire within a wall(s) which has not yet caused a smoke detector to trip) and this additional information allows Building Technology safety management personnel to more efficiently evacuate personnel and\or valuable property.

The foregoing detailed description of one or more embodiments of the automated demand response system has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. A building automation system comprising at least one peripheral device connected to a bus controller by a redundant bus system of two redundant communication buses, and monitors the redundant buses using four timers for faults to provide at least one indication, and responsive to determining a primary one of the buses is unavailable or at fault, to set a secondary one of the redundant buses as a primary bus, comprising:
a first communication bus having a first pathway between the bus controller and the at least one peripheral device with a first propagation delay;
a second communication bus having a second pathway between the bus controller and the at least one peripheral device with a second propagation delay, where the second pathway is redundant to the first pathway and the first propagation delay is different from the second propagation delay;
the bus controller coupled to the at least one peripheral device by the first communication bus and the second communication bus, and
the bus controller includes:
a first timer is associated with a predetermined maximum time period from a power up until bus activity occurs on each of the first communication bus and the second communication bus, where at least one visual indicator is activated in response to expiration of the first timer and bus activity has not been detected on at least one of the buses, wherein said power up sets one of the first communication bus and the second communication bus as a secondary bus while the other one is set as the primary bus;
a second timer associated with a periodic ping to the at least one peripheral device on each of the first communication bus and the second communication bus, where the at least one visual indicator is activated with expiration of the second timer and a response to the periodic ping to cease the periodic ping has not been detected, and wherein one of the first communication bus and second communication bus is being selectively set as the secondary bus while the other one is set as the primary bus in response to the expiration of the second timer;
a third timer is a valid bit timer and is associated with a typical single bit time of the redundant bus system to verify that the bit time is not too short on each of the first communication bus and the second communication bus, and the at least one visual indicator is activated if detected end of bit time occurs before expiration of the third timer; and
a fourth timer is associated with a difference between the first propagation delay and the second propagation delay, with the fourth timer being activated upon receipt of a first message on the first communication bus, and upon expiration of the fourth timer prior to a receipt of the first message on the second communication bus, the at least one visual indicator is activated and the second communication bus is being set as the secondary bus.

2. The building automation system of claim 1, where the first communication bus and second communication bus are controller area networking (CAN) buses.

3. The building automation system of claim 1, where the at least one of the first communication bus or second communication bus being deactivated is making that at least one of the first communication bus or second communication bus is a non-primary communication bus.

4. The building automation system of claim 1, where the first timer is set to a first predetermined value.

5. The building automation system of claim 4, where the first predetermined value is 20 seconds.

6. The building automation system of claim 1, wherein the at least one visual indicator is a light emitting diode.

7. The building automation system of claim 1, where the second timer is set to a second predetermined value.

8. The building automation system of claim 7, where the second predetermined value is 110 milliseconds.

9. The building automation system of claim 1, wherein the third timer is set to a third predetermined value.

10. The building automation system of claim 9, where the third predetermined value is 15 microseconds.

11. The building automation system of claim 1, where the fourth timer is set to a fourth predetermined value.

12. The building automation system of claim 11, where the fourth predetermined value is 2 microseconds.

\* \* \* \* \*